No. 620,737. Patented Mar. 7, 1899.
W. H. CHAPMAN.
DRIVING WHEEL FOR CYCLES.
(Application filed Mar. 16, 1898.)
(No Model.) 2 Sheets—Sheet 1.
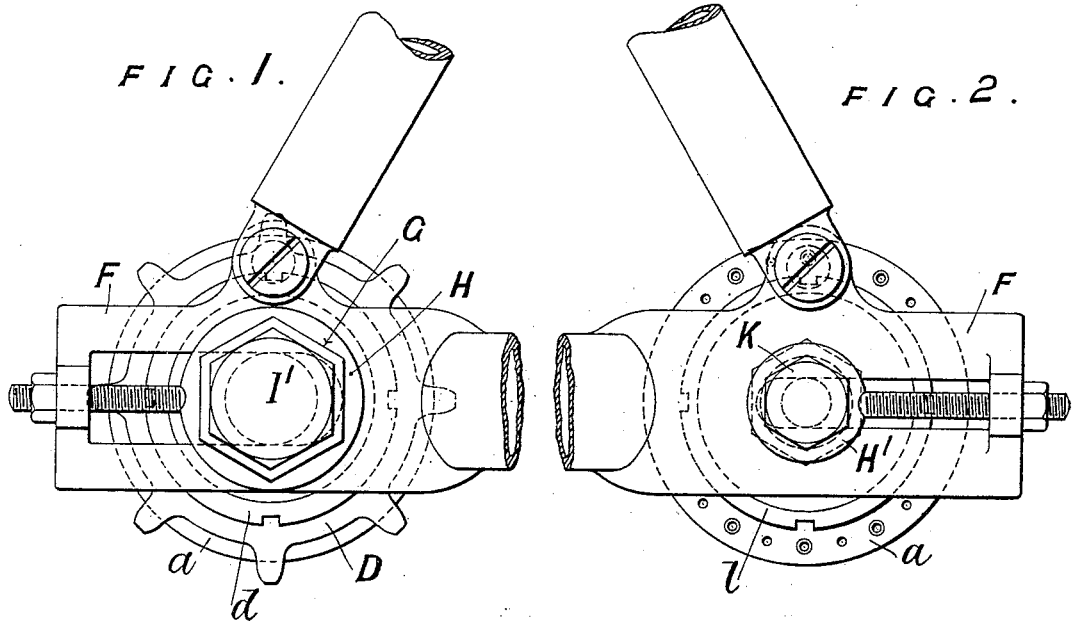
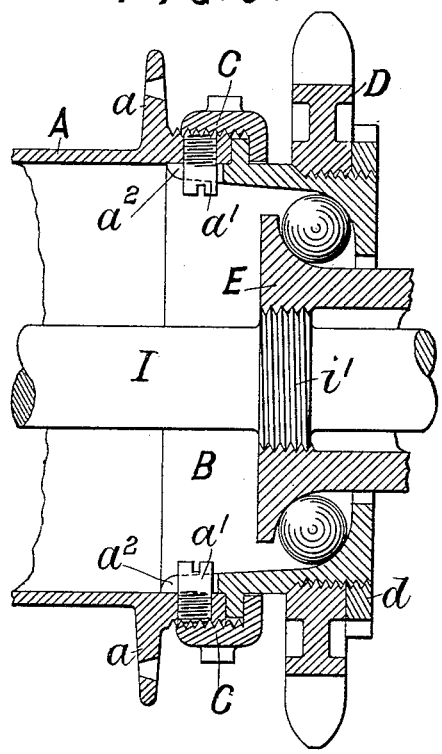
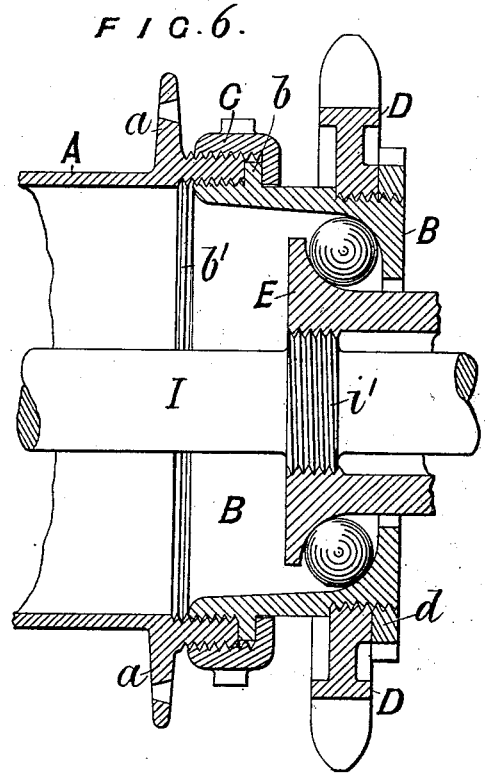

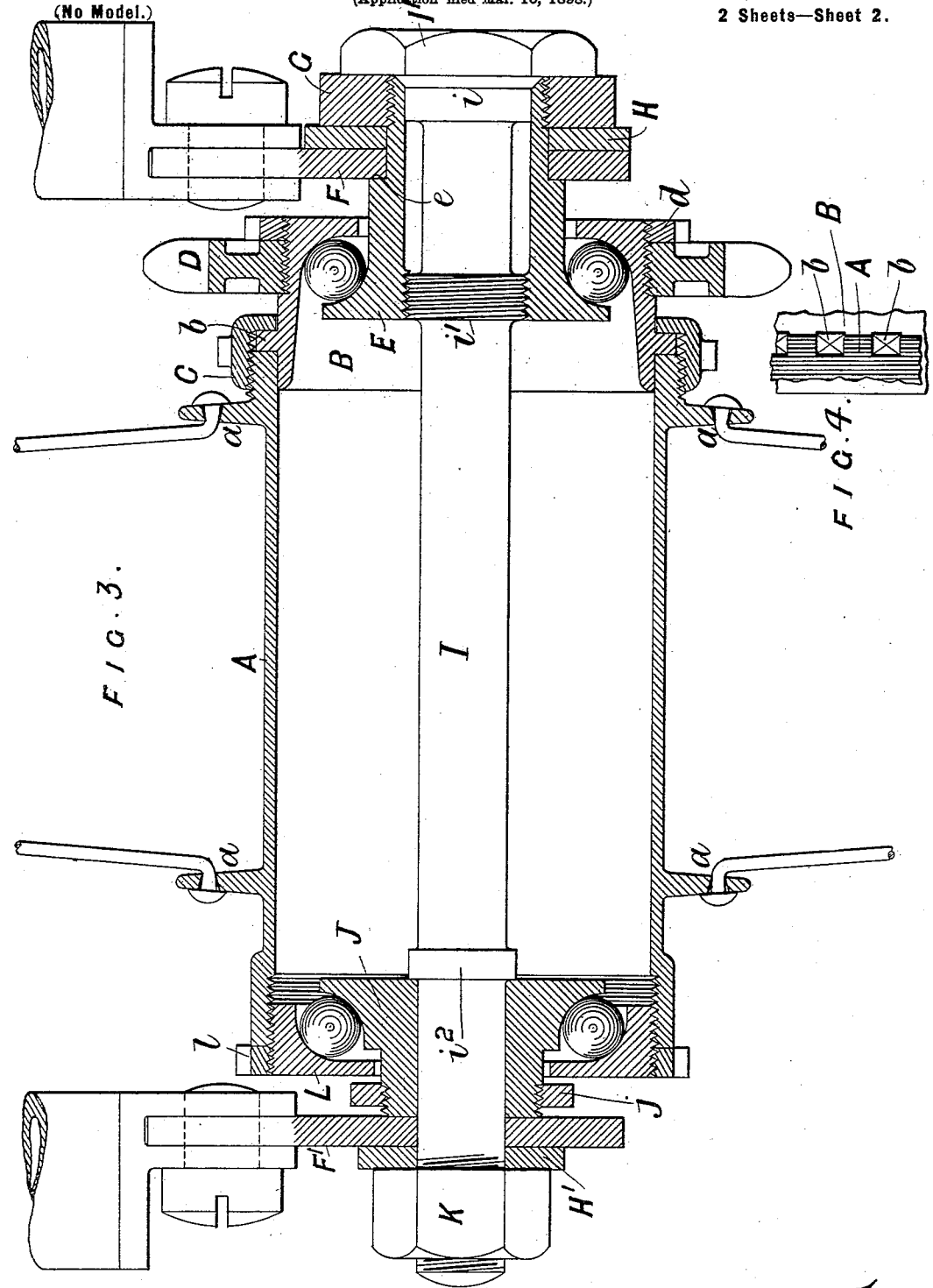

UNITED STATES PATENT OFFICE.

WILLIAM H. CHAPMAN, OF LONDON, ENGLAND.

DRIVING-WHEEL FOR CYCLES.

SPECIFICATION forming part of Letters Patent No. 620,737, dated March 7, 1899.

Application filed March 16, 1898. Serial No. 674,022. (No model.)

*To all whom it may concern:*

Be it known that I, WILLIAM HENRY CHAPMAN, engineer, a resident of 5 Christie road, South Hackney, London, E., England, have invented new and useful Improvements in Driving-Wheels for Bicycles, (for which an application for patent has been filed in Great Britain on the 22d day of January, 1898, No. 1,875,) of which the following is a full, clear, and exact description.

The object of this invention is to enable the driving-wheel of a bicycle to be removed from the machine without dismounting the driving-chain and gear-case; and it consists, essentially, in constructing the wheel-hub in two portions, so coupled together that by merely withdrawing the central spindle and unfastening the coupling the wheel may be removed along with one of its bearings, the other bearing, together with the sprocket-wheel, driving-chain, and gear-case, being left *in situ* in the frame.

Reference is to be had to the accompanying drawings, forming part of this specification, wherein—

Figures 1 and 2 are opposite end views, and Fig. 3 is a longitudinal section, of the wheel-hub constructed according to my invention. Fig. 4 shows developed in plan a portion of the interlocking joint between the parts A B. Figs. 5 and 6 show sectional views of modifications of the joint between the two parts of the hub.

The same letters of reference indicate the same parts in all the figures.

The wheel-hub is constructed of two portions A B, normally coupled by a union nut or collar C, embracing a flange $b$ on the part B and screwing on the threaded end of the main part A of the hub, the adjacent ends of the parts A and B being adapted to interlock in either of the ways shown in Figs. 3, 4, and 5 or in any other way which will insure a firm driving connection between them. The interlocking of the two parts A B of the hub may be effected in various ways. In any case the part B is adapted to fit in the end of the part A, so as to form a firm joint in the transverse direction of the hub and relieve the collar C of the strain of the load. As shown in Figs. 3 and 4, the driving connection is effected by cutting notches in the end of the part A and across the flange $b$, so as to leave teeth, which mutually engage each other, as shown. As shown in Fig. 5, studs $a'$ are fixed in the one part and engage in end notches $a^2$ in the other part.

In Fig. 6 the part $b'$ is threaded and screws into the threaded end of the part A, the screw-thread being of opposite inclination to the screw-thread of the collar C, so that any tendency to tighten the one will loosen the other. The part A carries the flanges $a\ a$, to which the spokes are connected, and on the part B is fixed the chain sprocket-wheel D, the joint uniting the two parts of the hub being situated between the sprocket-wheel D and the adjacent flange $a$. The part B is formed internally as a race or cup for the balls, which run upon the bearing-cone E', the said cone instead of being fixed upon the central spindle being secured directly in the slotted end of the back fork F by a nut G, screwed on the threaded end of the cone E. The cone E has a shoulder $e$, adapted to bear against the inside of the fork end F', through the slot of which the threaded end of the cone passes, as well as through the collar H of the chain-tension adjustment, against which collar the nut G is tightened up, so as to thereby clamp the cone immovably in the slotted end of the fork. The sprocket-wheel D may be fixed on the part B in any suitable manner. As shown, it is screwed on up to a shoulder and secured by a lock-nut $d$.

I is the central spindle, which is shouldered at $i$ to fit within the outer end of the cone E and is also shouldered and screw-threaded at $i'$ to screw through the threaded inner end of the cone, so as to support the cone under the stress of the load at the plane of the ball-path, the head I' of the spindle forming an external abutment bearing against the nut G. The cone J of the ball-bearing at the opposite end of the hub is clamped to the fork end F' by a shoulder $i^2$ upon the spindle I, which is drawn up tightly by the nut K, which screws on the end of the spindle and bears through the collar H' of the chain-tension adjustment against the fork end F', against the inner face of which the end of the cone J abuts and to which it is thus tightly clamped. The corresponding ball race or cup L screws adjustably into the main part A of the hub and is secured by a lock-nut $l'$.

By the arrangement described the wear of both sets of ball-bearings is taken up by a single adjustment and there is no tendency either to draw together or to spring apart the limbs of the back fork whether in securing the spindle or in adjusting the bearings, the cones E and J, fixed to said limbs, being maintained at a constant distance apart upon the spindle I.

A collar $j$ is screwed onto the cone J, so that when the spindle I is withdrawn and the wheel disconnected the cone J will be retained in place within the race and the balls will be prevented from falling out.

In order to renew a spoke at the side next the sprocket-wheel, it is often necessary to remove the latter from the hub—an operation of great difficulty when, as generally happens, the sprocket-wheel is screwed very tightly on its seat. The separation of the two portions of the hub obviates this difficulty.

I claim—

1. The driving-wheel of a bicycle having its hub constructed of two parts divisibly coupled in driving connection, the one part carrying the driving-chain sprocket-wheel and containing the one ball-bearing, and the other part carrying the remainder of the wheel, in combination with ball-bearing cones arranged adjacent to the limbs or members of the back fork, the cone of the sprocket-wheel side being fixed to its fork member independently of the axial spindle, and the cone at the other side being carried by the spindle and fixed by it to the corresponding fork member so that by withdrawing the spindle, and separating the hub parts, the wheel may be removed from the machine without dismounting any part of the driving-gear, substantially as specified.

2. The driving-wheel of a bicycle having its hub constructed of two parts divisibly coupled in driving connection by interlocking means on the two parts of the hub, and a screw union nut or collar engaging a flange on the one part and a screw-thread on the other part, the one part carrying the driving-chain sprocket-wheel and containing the one ball-bearing, and the other part carrying the remainder of the wheel, in combination with ball-bearing cones arranged adjacent to the limbs or members of the back fork, the cone of the sprocket-wheel side being fixed to its fork member independently of the axial spindle, and the cone at the other side being carried by the spindle and fixed by it to the corresponding fork member so that by withdrawing the spindle, and separating the hub parts, the wheel may be removed from the machine without dismounting any part of the driving-gear, substantially as specified.

3. In a bicycle or the like, the combination with a slotted fork member, a hollow ball-bearing cone extending through said fork member and in engagement therewith, of a spindle extending through the said cone, means, independent of the spindle, for clamping the cone to said fork member, the mating slotted fork member engaging the said spindle directly, another ball-bearing cone located entirely upon the inside of said mating fork member, and a wheel having a hub constructed in two separable sections each of which has a cup coöperating with one of the said cones.

4. The combination of the hub constructed in two separable sections one of which carries all the spokes, the sprocket-wheel carried by the other hub-section, a screw-collar connecting the two hub-sections and located between the sprocket-wheel and the spokes, said screw-collar being mounted to turn about the axis of the hub, the cone coacting with the spoke-section of the hub, the spindle passing through said cone and engaged by the adjacent fork member, the second cone coacting with the sprocket-wheel section of the hub, and means for fastening said second cone to its fork member independently of the axle.

5. In a driving-wheel for bicycles and the like, the combination of a hub-section connected with the spokes, another hub-section carrying the sprocket, a separable connection between the hub-sections, said connection being independent of the sprocket, so that the connection of the sprocket with its hub-section will not be affected by the removal of the wheel with the other hub-section, and a connection from the sprocket-carrying hub-section to the fork, to support said section when the wheel is removed.

6. In a driving-wheel for bicycles and the like, the combination of two separable hub-sections one carrying the wheel proper with its spokes, the sprocket carried by the other section, a movable connection engaging the two sections between the sprocket and the point where the spokes are attached, and means for supporting the sprocket-carrying hub-section directly in the fork, independently of the axle.

7. In a driving-wheel for bicycles and the like, the combination of a hub-section carrying the wheel proper with its spokes, another hub-section carrying a sprocket and separable from the first-named section, a movable connection adapted to engage both sections, a fastening device, independent of said movable connection for securing the sprocket to the corresponding hub-section, and means for supporting the sprocket-carrying section independently of the wheel-carrying section.

WILLIAM H. CHAPMAN.

In presence of—
C. G. CLARK,
T. W. KENNARD.